(12) United States Patent  
Matsumoto et al.

(10) Patent No.: US 7,883,147 B2
(45) Date of Patent: Feb. 8, 2011

(54) CUSHION STRUCTURE FOR VEHICLE SEAT

(75) Inventors: Yoshiyuki Matsumoto, Wako (JP);
Kenji Hattori, Wako (JP); Koichi Suyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 271 days.

(21) Appl. No.: 12/231,960

(22) Filed: Sep. 8, 2008

(65) Prior Publication Data
US 2009/0066132 A1  Mar. 12, 2009

(30) Foreign Application Priority Data
Sep. 12, 2007  (JP) ............... 2007-236921

(51) Int. Cl.
*B60N 2/42* (2006.01)
(52) U.S. Cl. .................. 297/216.1; 297/216.13; 297/284.4; 297/463.2
(58) Field of Classification Search ............ 297/216.1, 297/216.13, 219.1, 284.1, 284.4, 463.1, 463.2; 5/937
See application file for complete search history.

(56) References Cited

U.S. PATENT DOCUMENTS

| 4,320,922 | A | * | 3/1982 | Meritis | 297/220 |
| 4,487,451 | A | * | 12/1984 | Fiorini | 297/219.1 |
| 4,690,455 | A | * | 9/1987 | Bailey et al. | 297/238 |
| 4,790,592 | A | * | 12/1988 | Busso et al. | 297/184.11 |
| 4,900,087 | A | * | 2/1990 | Crisp | 297/238 |
| 5,080,431 | A | * | 1/1992 | Frazier | 297/184.11 |
| 5,308,139 | A | * | 5/1994 | Rieger | 297/184.11 |
| 6,742,837 | B1 | * | 6/2004 | Alexander | 297/188.21 |
| 6,746,069 | B1 | * | 6/2004 | McKenzie | 296/63 |
| 6,764,134 | B1 | * | 7/2004 | Crescenzi et al. | 297/219.12 |

FOREIGN PATENT DOCUMENTS

| JP | 09-175243 | 7/1997 |
| JP | 2007-168703 | 7/2007 |

* cited by examiner

*Primary Examiner*—Peter R. Brown
(74) *Attorney, Agent, or Firm*—Carrier Blackman & Associates, P.C.; William D. Blackman; Joseph P. Carrier (57) ABSTRACT

A vehicle seat cushion structure whereby even when a steering wheel or other object is pushed closer toward a vehicle occupant after a vehicle is involved in a head-on collision and little space is left in front of the vehicle occupant, the space can be readily enlarged. The cushion structure comprises a supporting member provided on a seat frame and a cushion member disposed in a folded state on the supporting member. The folded cushion member is capable of being withdrawn from a cushion removal opening formed on a side of a seat. Space is provided between the vehicle occupant and the steering wheel or the like when the cushion member is removed via the cushion removal opening.

19 Claims, 10 Drawing Sheets

CUSHION STRUCTURE FOR VEHICLE SEAT

FIELD OF THE INVENTION

The present invention relates to a seat cushion structure for a vehicle, which is designed to provide a space needed to rescue an occupant of a vehicle or to allow him/her to escape when the vehicle is involved in a collision.

BACKGROUND OF THE INVENTION

A seat apparatus is known from, e.g., JP 09-175243 A wherein a cushion is formed using an airspring, a seat is manually or automatically deflated, and a space needed to facilitate escape is formed.

Further, a vehicle seat arranged to retract when a vehicle is involved in a head-on collision is disclosed in JP 2007-168703 A.

Figure 10:
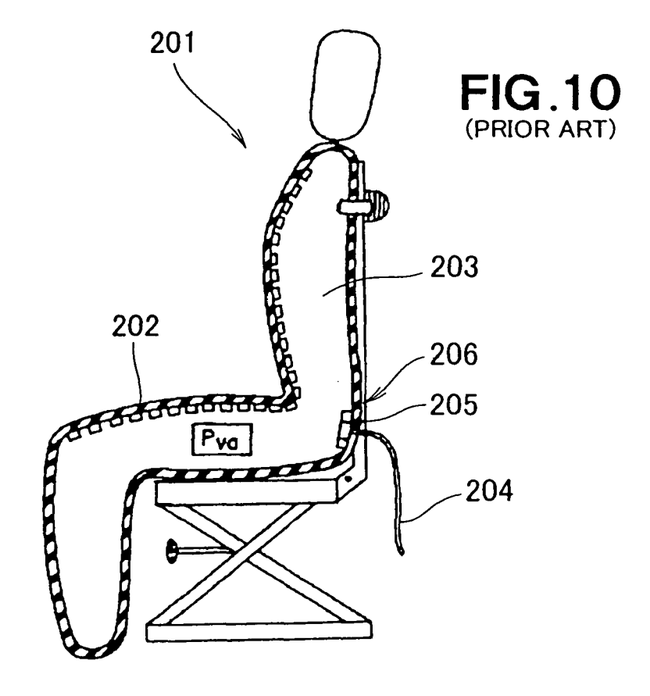
FIG. 10 is a schematic view showing, partly in cross section, a conventional cushion structure formed using an airspring.

FIG. 10 hereof illustrates the seat apparatus of JP 09-175243 A. As shown in FIG. 10, the vehicle seat apparatus 201 comprises a cushion 202 formed of an airspring 203; and a wire cable 204 that opens a stopcock 205 when a vehicle is involved in a collision and a vehicle body panel collapses, so that the weight of a vehicle occupant or another force causes air to be removed from a discharge opening 206 to cause the airspring 203 to deflate, thereby providing a space needed to rescue the vehicle occupant However, the air pressure of the airspring 203 changes in the seat apparatus 201 due to atmospheric pressure or other environmental conditions; therefore, the seat can become less comfortable, and the air pressure can be difficult to control. A control component for opening the stopcock 205 must also be added, making the structure more complex.

Figure 11:
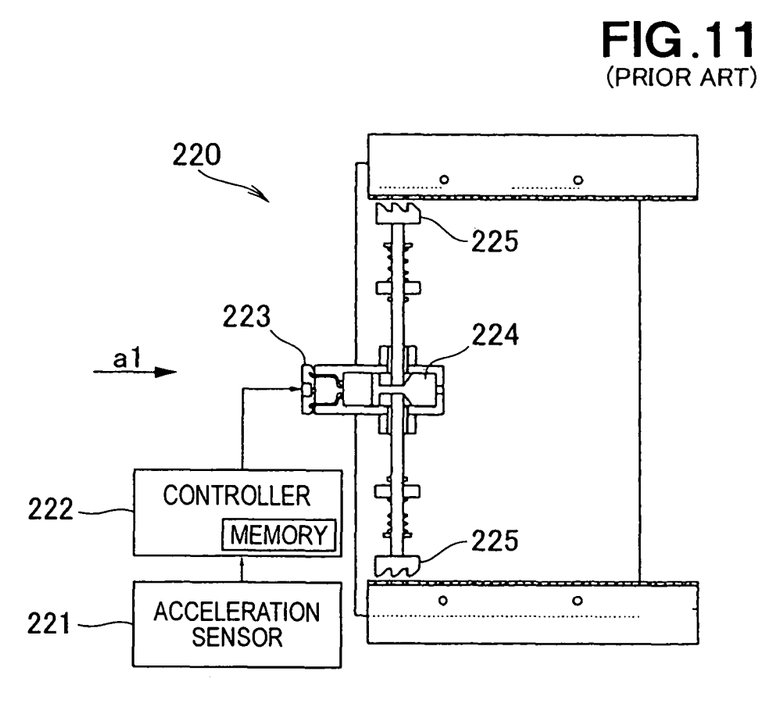
FIG. 11 is schematic view showing a separate conventional vehicle seat employing a mechanism for automatically retracting the seat rearward.

FIG. 11 illustrates the vehicle seat of JP 2007-168703 A. As shown in FIG. 11, the vehicle seat apparatus 220 includes a controller 222 that, when a vehicle is involved in a head-on collision, causes, on the basis of information from an acceleration sensor 221, drive means 223 to retract a sliding piece 224 to the state shown in the Figure, with the result that a locking part 225 is released from the seat. When a load is applied to the seat in a rearward direction, as shown by arrow a1, the vehicle seat 220 automatically retracts to allow the vehicle occupant to easily escape.

However, since the seat is caused to retract automatically when a load is applied to the vehicle seat 221 in a rearward direction (in the direction shown by arrow a1), a problem is presented in vehicles having a rear seat behind the seat 221, because a passenger occupying the rear seat will serve as a source of interference. Furthermore, a rail that guides the retraction of the seat may deform in the event of a head-on collision.

SUMMARY OF THE INVENTION

An object of the present invention is to provide a structure of a cushion for a vehicle seat that does not require compressed air or rails on which the seat slides longitudinally, and that facilitates the removal of a vehicle occupant from a space that has been reduced immediately after a vehicle is involved in a head-on collision.

According to a first aspect of the present invention, there is provided a cushion structure for a vehicle seat covered by an outer member and disposed on a seat frame which is attached to a vehicle body, which cushion structure comprises: a supporting member provided on the seat frame; a cushion member in the form of an elongate thick plate disposed on the supporting member in a folded state; and a cushion removal opening formed on one of left and right side portions of the seat and sized to allow the folded cushion member to pass therethrough when the folded cushion member, while being unfolded, is withdrawn from on the supporting member.

If an arrangement is provided whereby the cushion member is pulled from the cushion-removal opening when the instrument panel or steering wheel press inward in the direction of the vehicle occupant as a result of a head-on collision involving the vehicle, interfering with the vehicle occupant, and making it impossible to carry the vehicle occupant out of the vehicle, then the cushion member will be withdrawn from the space between the supporting member disposed on the seat frame and a pad member covering the cushion member. Therefore, the pad member will be crushed by the weight of the vehicle occupant or other force applied to the seat cushion. As a result, the vehicle occupant will be separated further from the compressed instrument panel and the steering wheel, and a space will be formed. Accordingly, an advantage is presented in that it becomes easier to remove the vehicle occupant from a space that has become cramped after a head-on collision.

Preferably, the cushion member has a handle at an end positioned proximately to the cushion-removal opening. Accordingly, the end of the cushion member is readily pulled from the cushion-removal opening, the cushion member is readily removed from the space between the supporting member and pad member that covers the cushion member, and the vehicle occupant becomes easier to remove from a space that has become cramped after the vehicle has been involved in a head-on collision.

Desirably, the cushion member has a low-friction member on a surface opposite a surface that contacts the supporting member. When the cushion material is folded, the friction coefficient when the two surfaces on the opposite side come into contact and rub against each other thus decreases. Accordingly, the cushion member becomes easier to withdraw, and the operation of removing the cushion member becomes easier. Therefore, it becomes easier to remove the vehicle occupant from a space that has become reduced when a vehicle is involved in a head-on collision.

In a preferred form, the supporting member has a low-friction member on a surface thereof that contacts the cushion member. The friction coefficient associated with the sliding between the supporting member and cushion member slide decreases, the cushion member can be more readily removed, and the operation of removing the cushion member becomes easier. Therefore, it becomes easier to remove the vehicle occupant from a space that has become reduced when a vehicle is involved in a head-on collision.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Reference is now made to FIGS. 1 to 6 showing a cushion structure according to a first embodiment of the present invention.

Figure 1:
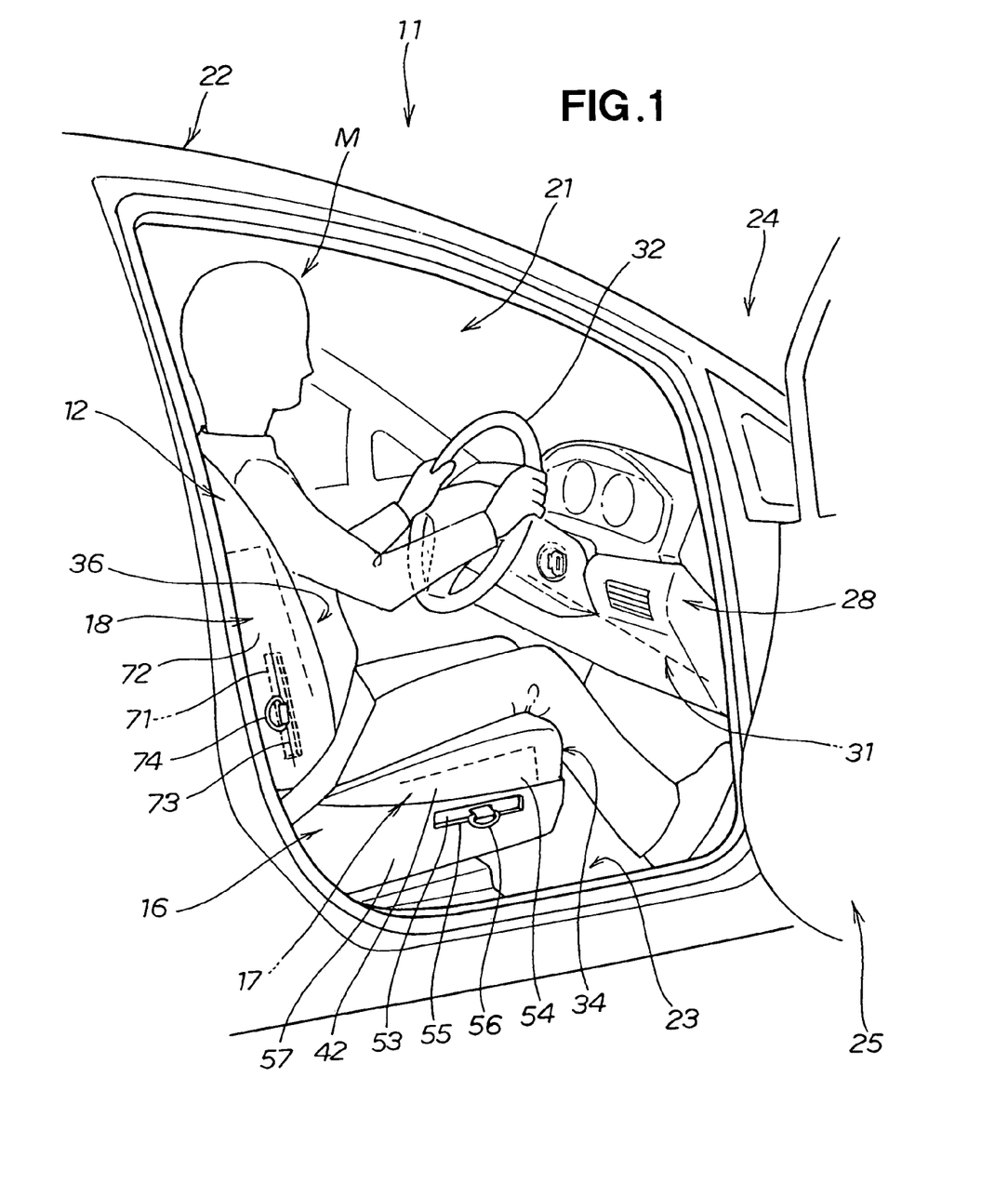
FIG. 1 is a perspective view showing a cushion structure according to a first embodiment of the present invention as applied to a vehicle driver seat.

As shown in FIG. 1, a vehicle seat comprises a driver seat 12 of a vehicle 11. A cushion structure 16 of the driver seat 12 includes a first cushion structure 17 and a second cushion structure 18. The cushion structure 16 is also applied to a front passenger seat not shown. Since the front passenger seat is substantially identical in construction to the driver seat, its discussion will be omitted.

The vehicle 11 has a passenger compartment 21 and a vehicle body 22. The vehicle body 22 comprises an underbody 23 forming a floor, a front body 24, and a front right door 25. An instrument panel 28, a steering column 31, and a steering wheel 32 are disposed in the front body 24.

Figure 2:
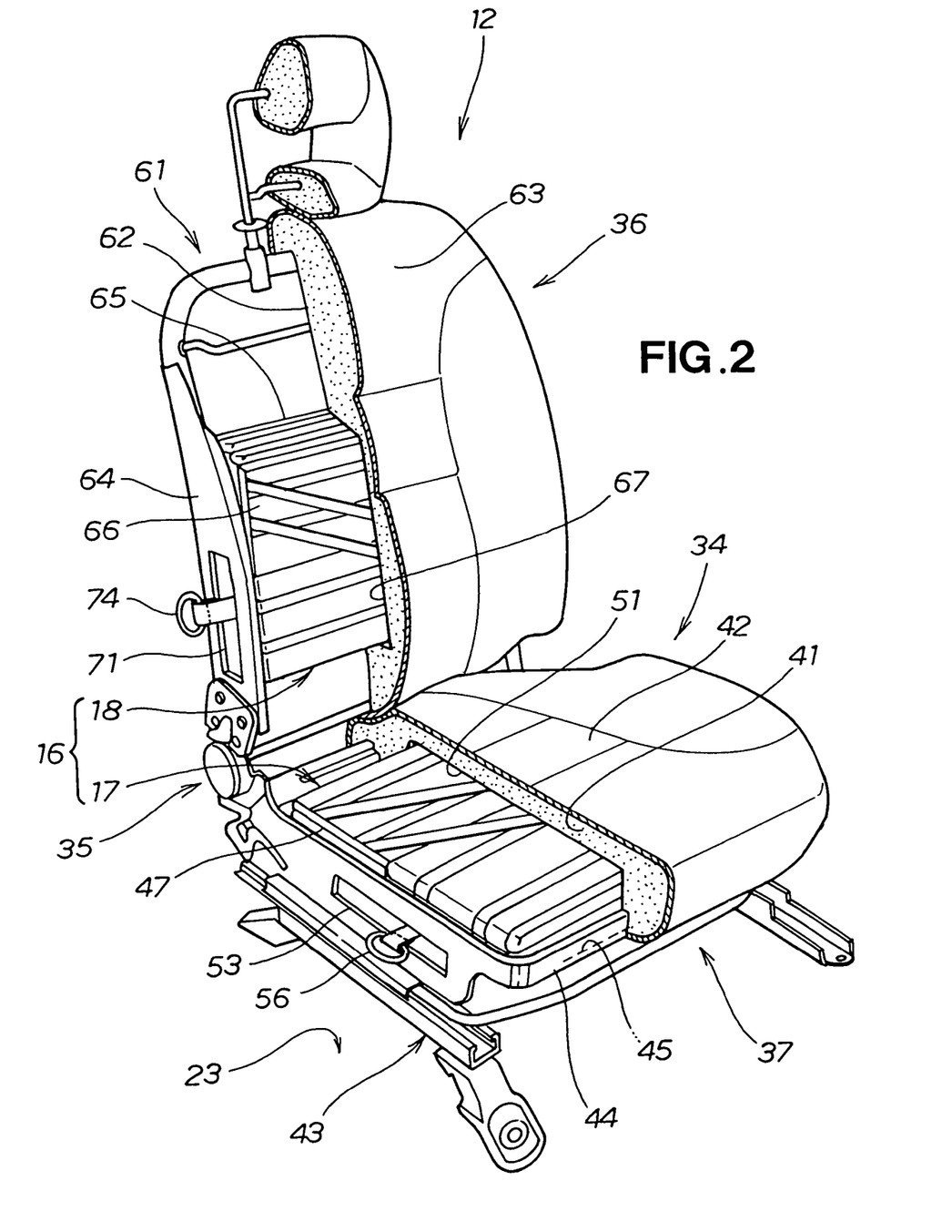
FIG. 2 is a perspective view illustrating the cushion structure of FIG. 1 with a part cut away.

As can be appreciated from FIGS. 1 and 2, the driver seat 12 comprises a seat cushion 34 and a seat back 36 connected to the seat cushion 34 via a reclining device 35.

The seat cushion 34 comprises a seat frame or a seat cushion frame 37 secured to the underbody 23; the first cushion structure 17 disposed on the seat cushion frame 37; a first pad member 41 covering the first cushion structure 17; and a first outer member 42 covering the first pad member 41.

The seat cushion frame 37 comprises a slide mechanism 43 secured to the underbody 23; and a first frame 44 attached to the slide mechanism 43. The first cushion structure 17 is provided on a first supporting member 45, which is attached to the first frame 44.

The first pad member 41 has a first cushion-accommodating recess 51 formed to accommodate a first cushion member 47. The material used for the first pad member 41 is identical to existing materials composed of, e.g., urethane or the like.

Figure 6A:
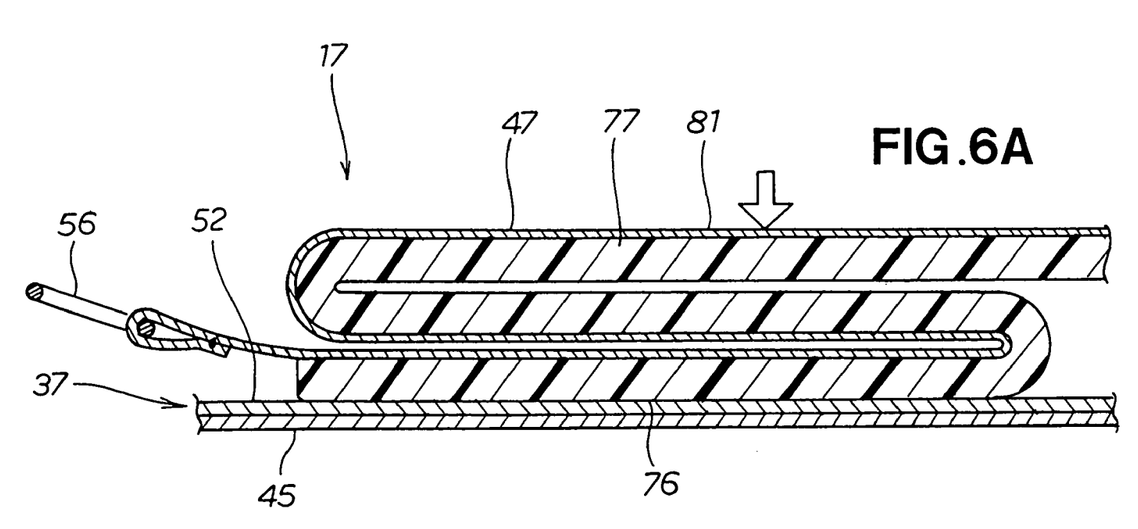
FIGS. 6A and 6B are cross-sectional views illustrating the cushion member in a folded state and a withdrawn state.
Figure 6B:
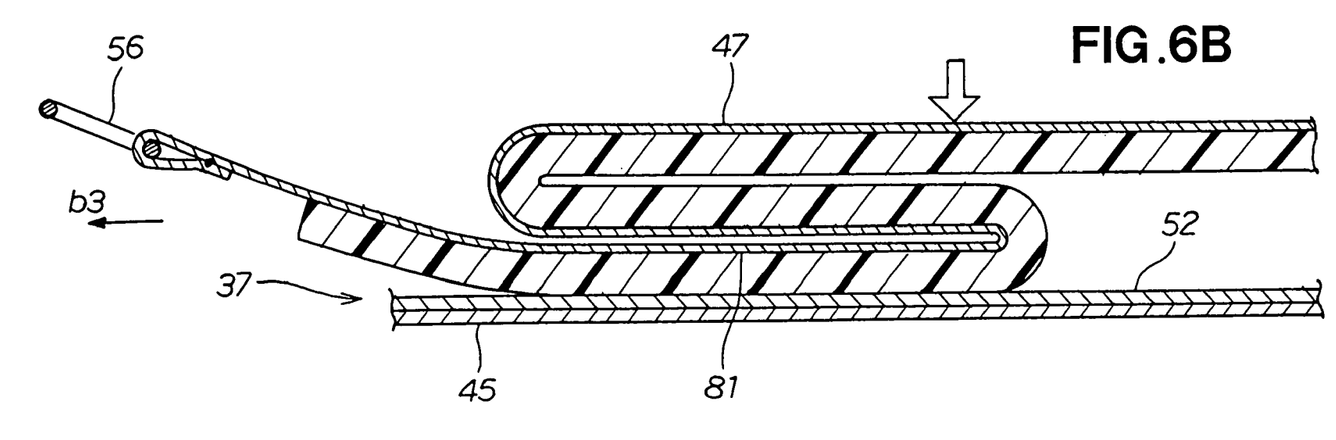

The supporting member 45 has a flat surface, and a layer composed of a fluororesin or other resin with a low friction coefficient is provided on the flat surface as a low-friction layer 52 (see FIG. 6).

The first cushion structure 17 contains the first supporting member 45, which is provided to the seat cushion frame 37; the first cushion member 47, which is foldedly disposed on the first supporting member 45; a first removal opening 53, which is formed on the first frame 44 for removing the first cushion member 47; a first cushion removal opening 55 (see FIG. 1) formed on a right-side part 54 (see FIG. 1) of the seat cushion 34 in substantial alignment with the first removal opening 53; and a first handle 56, which is exposed to the passenger compartment 21 from the first cushion removal opening 55 and is attached to the first cushion member 47.

The first cushion removal opening 55 (FIG. 1) is formed on a frame cover 57 of the first frame 44, which is provided to the right outer part 54. However, the first cushion removal opening 55 may be formed on the first outer member 42 positioned on the right outer part 54.

A seat back 36 comprises a seat back frame 61, which is a seat frame connected via the reclining device 35 to the seat cushion frame 37; a second cushion structure 18, which is disposed on the seat back frame 61; a second pad member 62, which covers the second cushion structure 18; and a second outer member 63, which covers the second pad member 62.

The seat back frame 61 has a second frame 64 that is secured to the reclining device 35, and the second cushion structure 18 is provided to a second supporting member 65, which is attached to the second seat frame 64.

The second pad member 62 has a second cushion-accommodating recess 67, which is formed to accommodate a second cushion member 66. The material used for the second pad member 62 is identical to existing materials composed of, e.g., urethane or the like.

The second supporting member 65 has a low-friction member 52 processed in a manner identical to that of the first supporting member 45, and is included in the second cushion structure 18.

The second cushion structure 18 comprises the second supporting member 65, which is provided to the seat back frame 61; the second cushion member 66, which is foldedly disposed on the second supporting member 65; a second removal opening 71, which is formed on the second frame 64 allowing removal of the second cushion member 66; a second cushion removal opening 73 (see FIG. 1), which is formed on a back right side part 72 (FIG. 1) of the second outer member 63 to substantially the same size as the second removal opening 71; and a second handle 74, which is exposed to the passenger compartment 21 via the second cushion removal opening 73 and is attached to the second cushion member 66.

Figure 3A:
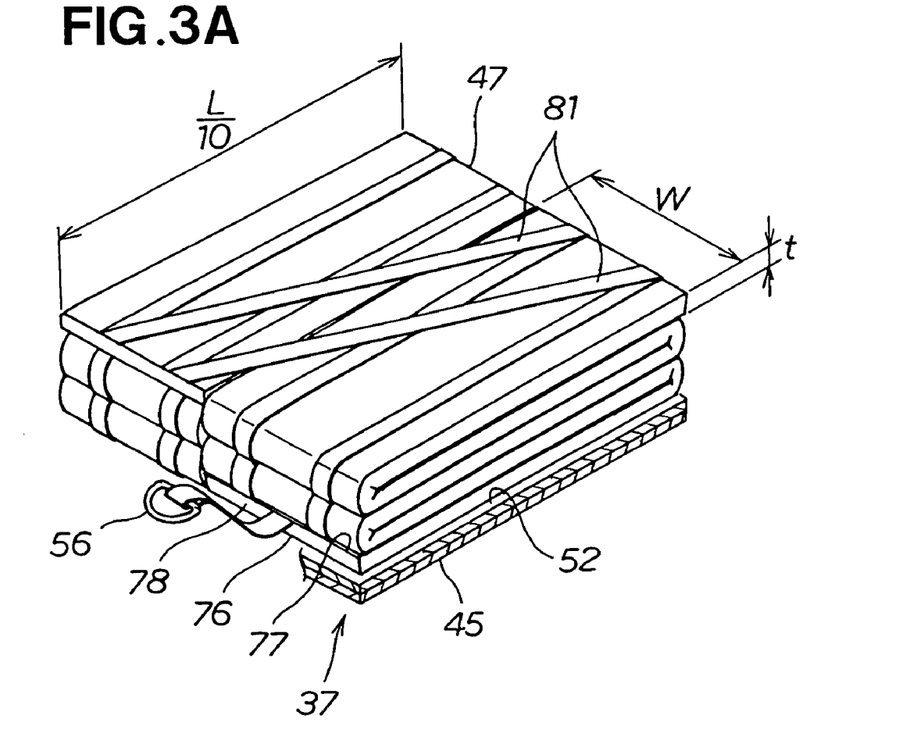
FIGS. 3A and 3B are perspective views showing the cushion member of FIG. 2 in a folded state and an unfolded state.
Figure 3B:
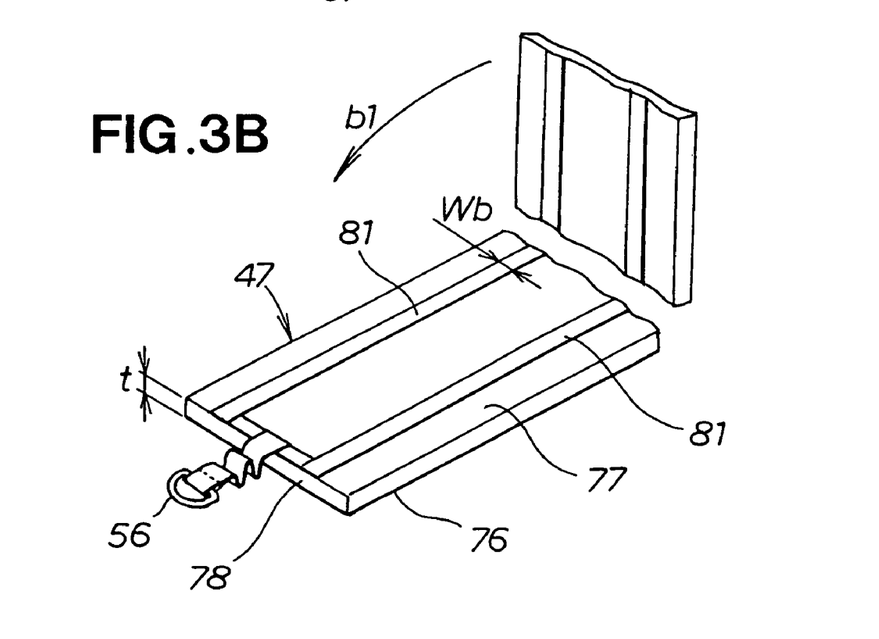

FIGS. 3A and 3B show the first cushion member 47 used in the cushion structure of the first embodiment in folded and unfolded states.

The first cushion member 47 has a first surface 76, which is formed in the shape of a long and thick plate, and comes into contact with the first supporting member 45; a second surface 77, which is on the side opposite the first surface 76; and an end 78, which communicates with the first surface 76 and the second surface 77, and is disposed in the first cushion removal opening 55.

The first cushion member 47 has a pulling belt 81 comprising a low-friction member joined to the second surface 77. The first handle 56 is linked to the pulling belt 81. The symbol t indicates a thickness, W indicates a width, and a total length L is divided in two. In other words, the first cushion member 47 is not only divided into two parts, but is folded five times, as shown by the arrow b1, to a length that is one-tenth of the length L, in approximately 5 equal parts. The first cushion member 47 is disposed so as to lie in the longitudinal direction of the vehicle, and the front and rear of the first cushion member 47 are linked by the pulling belt 81.

The phrase "in the form of a thick plate" refers to a thickness of such a degree that the first cushion member 47 can exhibit a cushioning function. The thickness is not defined in terms of being equal to or greater than several millimeters or being in a range within two values of a certain number of millimeters. Accordingly, other terms that can be used are a "thickness at which a cushioning function is present" or "thickness at which a cushioning function is able to be exhibited."

The pulling belt 81 is made from, e.g., a polyamide resin (product name: Nylon). An adhesive or stitches are used to join the pulling belt 81 to the first cushion member 47.

A width Wb of the pulling belt 81 is of an arbitrary value, and one belt will be sufficient if the width Wb is large.

The second cushion member 66 is identical to the first cushion member 47, for which reason a description thereof has been omitted.

The cushion member 47 is folded five times, but parts of adjoining folded-over surfaces can be joined using an adhesive with a low adhesive strength or a thread having a low tensile strength. As a result, it is possible to prevent the folded state from collapsing under the weight of the vehicle occupant.

The thickness t, width W, and total length of the first cushion member 47 may be set as desired. The first cushion member 47 is folded five times in the present embodiment, but the number of folds and the form in which the first cushion member 47 is folded are not defined.

The low-friction pulling belt 81 is joined to the second surface 77 of the first cushion member 47; however, the low-friction pulling belt 81 may be joined to the first surface 76 so that the belt 81 will be joined to both surfaces.

The low friction pulling belt 81 may also be joined only to the first surface 76.

The pulling belt 81 also functions as a low-friction member, but another example that can be cited as a low-friction member is a resin layer that is applied or otherwise joined to the entirety of the first surface 76 and second surface 77, holding the pulling belt 81 thereunder.

The action of the cushion structure of the first embodiment will now be described.

Figure 4:
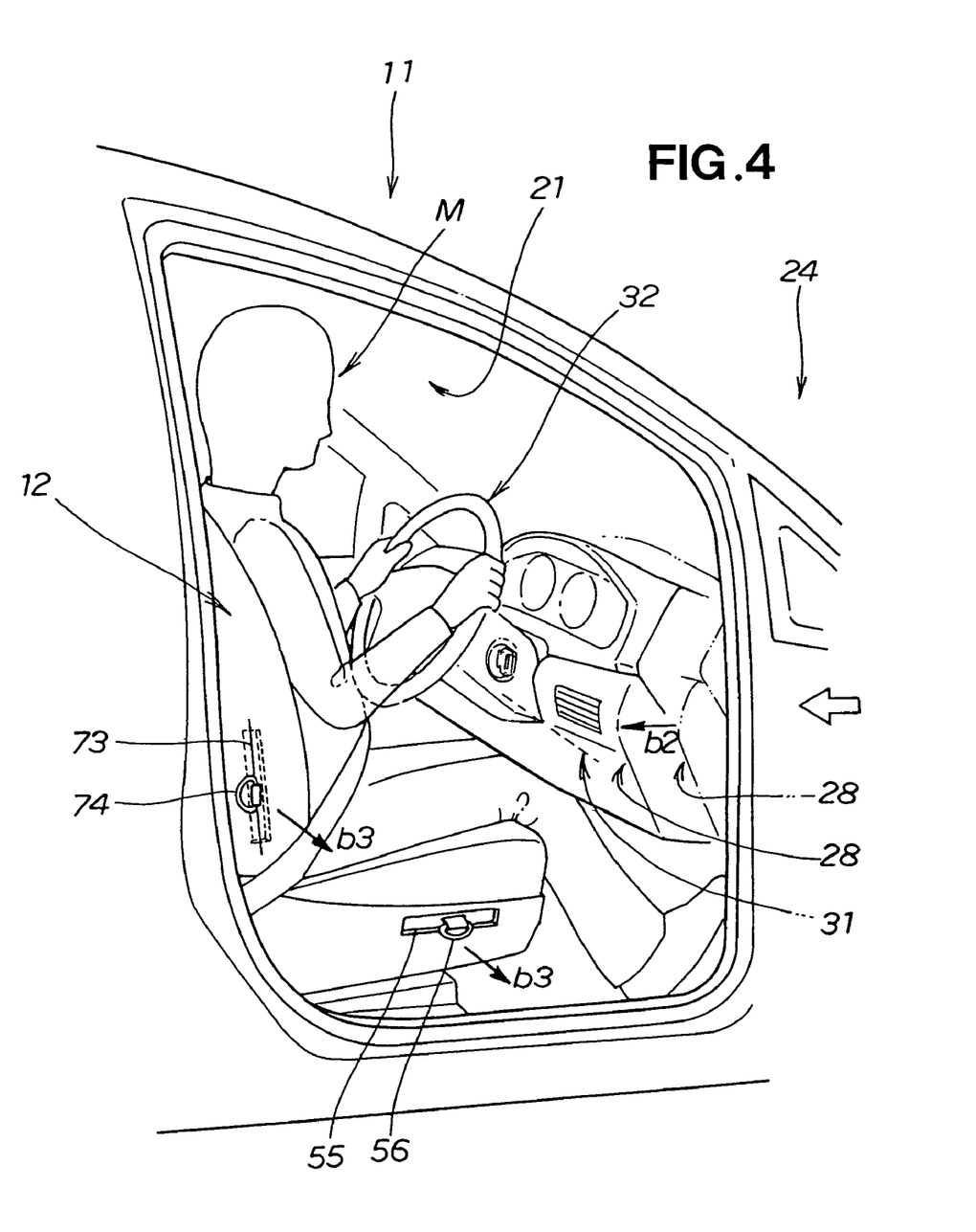
FIG. 4 is a schematic view showing a steering wheel and the like moved closer to a vehicle occupant from the position of FIG. 1 as a result of a head-on collision of the vehicle.

As shown in FIG. 4, when a vehicle 11 is involved in a head-on collision, the front body 24 suffers damage, in conjunction with which the instrument panel 28 (shown by the chain double-dashed line), the steering column 31, and the steering wheel 32 are pushed inwardly within the passenger compartment 21 as shown by arrow b2, where they may reach as far as a vehicle occupant M sitting in the driver seat 12. If conditions are such that the instrument panel 28 (indicated by the solid line), the steering column 31, and the steering wheel 32 that have been pushed toward the vehicle occupant M prevent the occupant from being carried out of the vehicle, then a rescuer or another person pulls the first handle 56 and the second handle 74 provided to the driver seat 12 toward the front right door 25 (in the direction of arrow b3).

Figure 5:
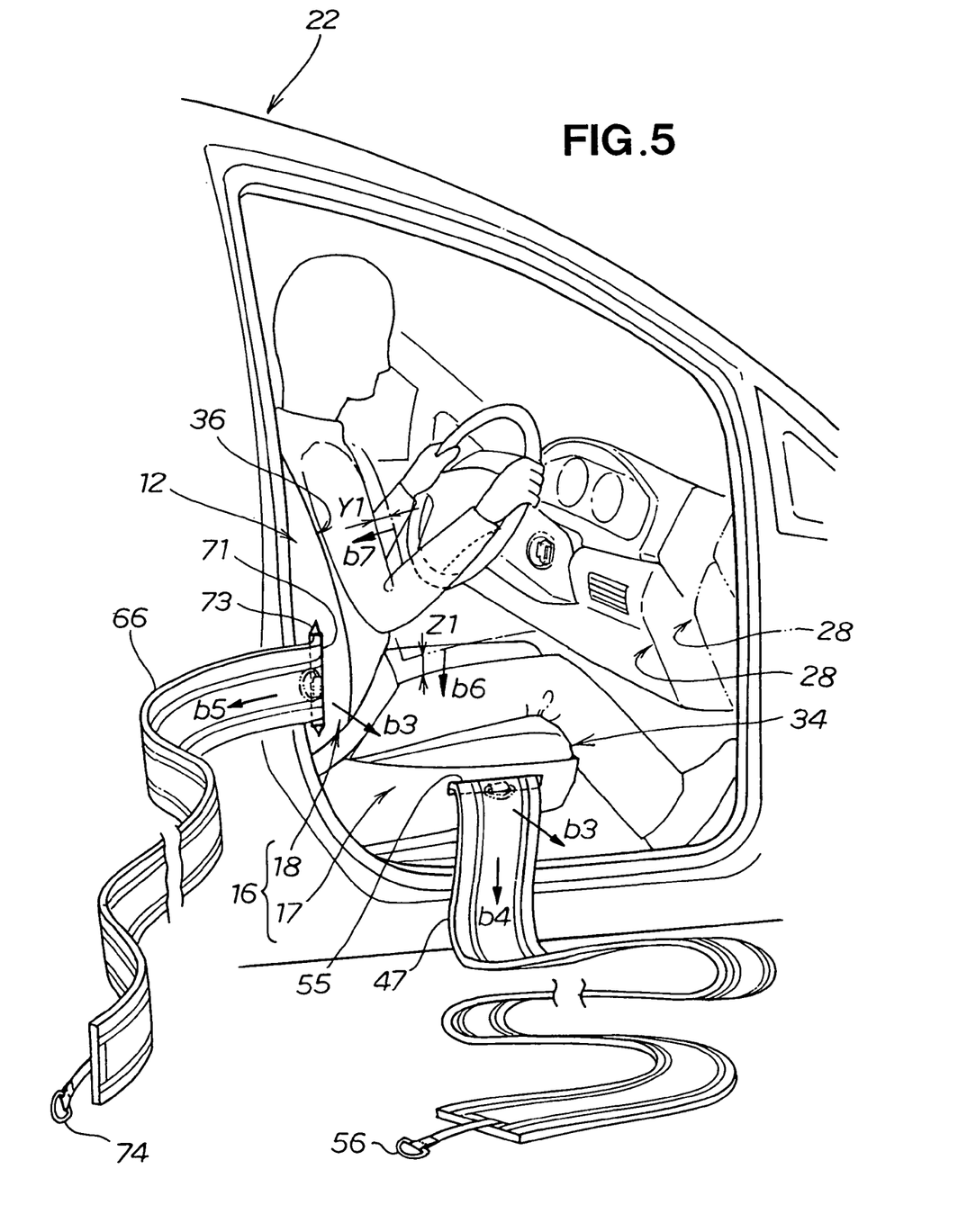
FIG. 5 is a schematic view illustrating the cushion member withdrawn to provide a space between the vehicle occupant and the steering wheel.

When the above action is performed, as shown in FIG. 5, the first cushion member 47 is withdrawn from the first removal opening 53 and the first cushion removal opening 55 in the direction of arrow b4; and the first cushion material 47 is removed from the space between the first pad member 41 and the first supporting member 45 provided to the seat cushion frame 37 (see FIG. 2). The first pad member 41 will collapse under the weight of the vehicle occupant M or another force applied to the seat cushion 34.

When the second handle 74 is pulled toward the front right door 25 (in the direction of arrow b3), the second cushion member 66 is withdrawn from the second removal opening 71 and the second cushion removal opening 73 as shown by arrow b5; and the second cushion member 66 is removed from the space between the second pad material 62 and the second supporting member 65 provided to the seat back frame 61 (FIG. 2). The second pad member 62 will collapse under the weight of the vehicle occupant M or other force applied to the seat back 36.

When the seat cushion 34 and seat back 36 collapse, the vehicle occupant M descends toward the seat cushion frame 37 by a distance Z1 as shown by arrow b6, and moves back towards the seat back frame 61 by a distance of Y1 as shown by arrow b7, using as a reference the position of the vehicle occupant M (chain double-dashed line) sitting in the driver seat 12 before the seat cushion 34 and seat back 36 have collapsed. Accordingly, the vehicle occupant M moves back from the inwardly pushed instrument panel 38, steering column 31, and steering wheel 32; and a space is formed between the occupant and the instrument panel 38, steering column 31, and steering wheel 32. The removing of the vehicle occupant M from a space that has become cramped when a vehicle is involved in a head-on collision is accordingly facilitated.

Reference is made next to FIGS. 6A and 6B showing the cushion member used in the cushion structure in states of being folded and partially withdrawn.

In the first cushion structure 17, when the first handle 56 is pulled toward the front right door 25 (FIG. 1; in the direction of arrow b3), the low-friction member (pulling belt) 81 joined to the second surface 77 of the first cushion member 47 causes the friction coefficient of the second surfaces 77 rubbing against one another to decrease. The first cushion member 47 becomes easier to withdraw, and the vehicle occupant M becomes easier to remove from a space that has become cramped after a head-on collision has occurred.

The second cushion structure 18 has the same action and effect as the first cushion structure 17. Specifically, when the second handle 74 is pulled toward the front right door 25 (in the direction of arrow b3), the second cushion member 66 becomes easier to withdraw, and the operation of removing the second cushion member 66 becomes easier.

In the first cushion structure 17, the low-friction layer 52 is applied to a surface of the first supporting member 45, which is provided to the seat cushion frame 37, and which has the first cushion member 47 mounted thereon. Therefore, the friction coefficient of the rubbing of the first supporting member 45 and second cushion member 47 decreases, the first cushion member 47 becomes easier to withdraw, and it becomes easier to remove the vehicle occupant M from a space that has become reduced after a head-on collision.

With the second cushion structure 18 as well, the low-friction member 52 applied to the second supporting member 65 makes the second cushion member 66 easier to withdraw, and facilitates the operation of removing the second cushion member 66.

The low-friction member (pulling belt) 81 can be joined to both surfaces (the first surface 76 and the second surface 77) of the first cushion member 47. As a result, the friction coefficient when the first surfaces 76 rub together decreases, the first cushion member 47 becomes easier to withdraw, and the operation of removing the first cushion member 47 becomes easier still.

The second cushion structure has the same action and effect as the as the first cushion structure 17.

Figure 7A:
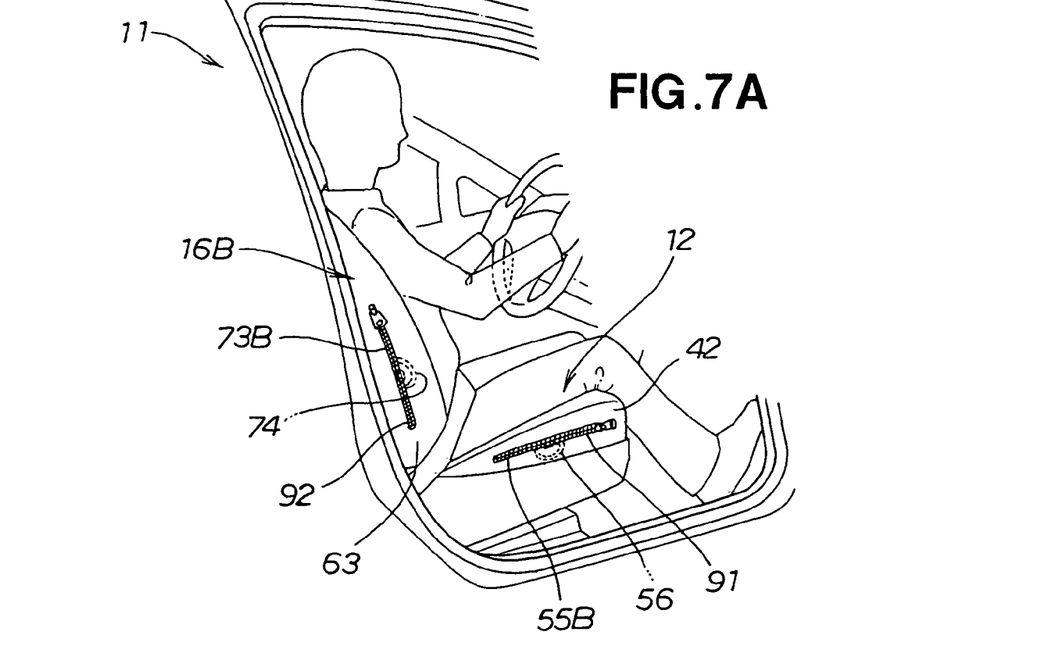
FIGS. 7A and 7B are schematic views showing a cushion structure according to a second embodiment of the present invention.
Figure 7B:
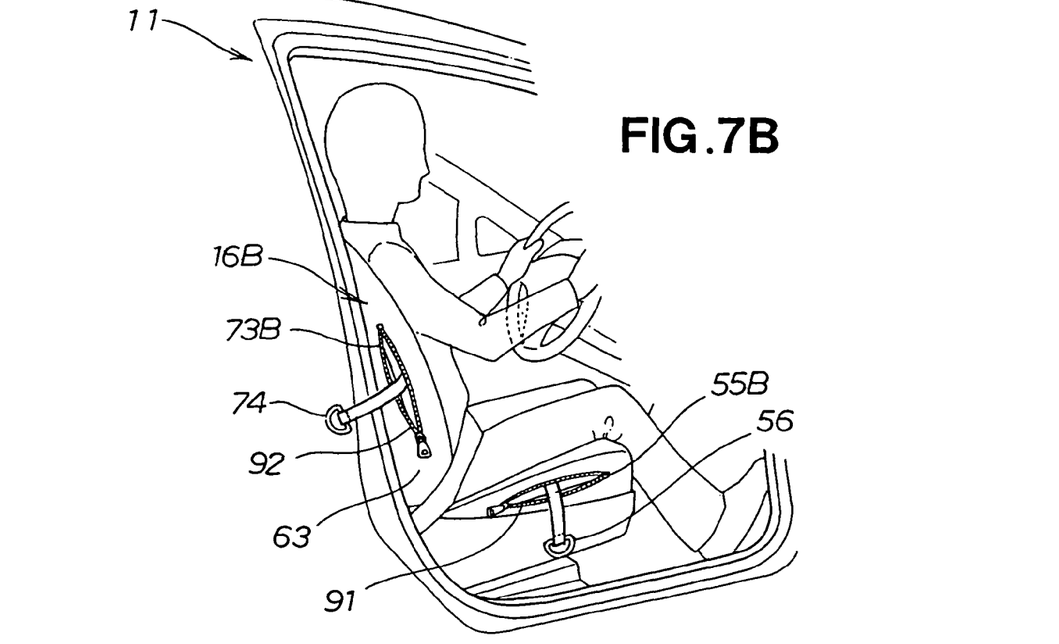

Reference is now made to FIGS. 7A and 7B showing a cushion structure according to a second embodiment of the present invention. Members that are the same as in the cushion structure of the first embodiment shown in FIGS. 1 and 2 have been given the same reference symbols, and descriptions thereof are omitted.

A cushion structure 16B of a second embodiment has a first cushion removal opening 55B and a second cushion removal opening 73B.

The first cushion removal opening 55B has a first fastener 91, which is provided to the first outer member 42, as shown in FIG. 7A. The first fastener 91 is opened and the first handle 56 is pulled, as shown in FIG. 7B.

The second cushion removal opening 73B has a second fastener 92, which is provided to the second outer member 63. The second fastener 92 is opened and the second handle 74 is pulled, as shown in FIG. 7B.

The cushion structure 16B of the second embodiment has the same action and effect as the cushion structure of the first embodiment 16.

In the cushion structure of the second embodiment 16B, the first cushion removal opening 55B has the first fastener 91; therefore, when the first fastener 91 is closed, the first handle 56 can be stored and concealed inside the first outer member 42.

Similarly, when the second fastener 92 is closed, the second handle 74 can be stored and concealed inside the second outer member 63.

Figure 8A:
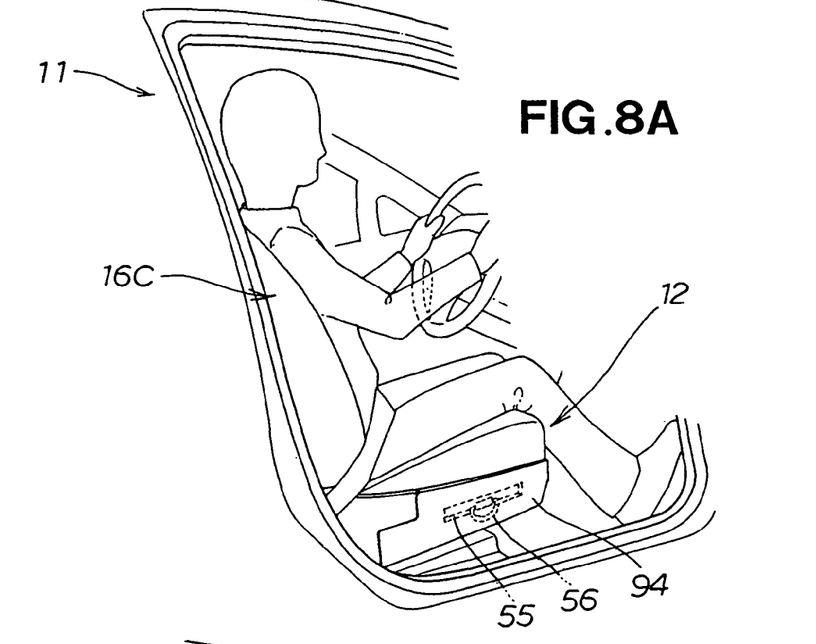
FIGS. 8A and 8B are schematic views showing a cushion structure according to a third embodiment of the present invention.
Figure 8B:
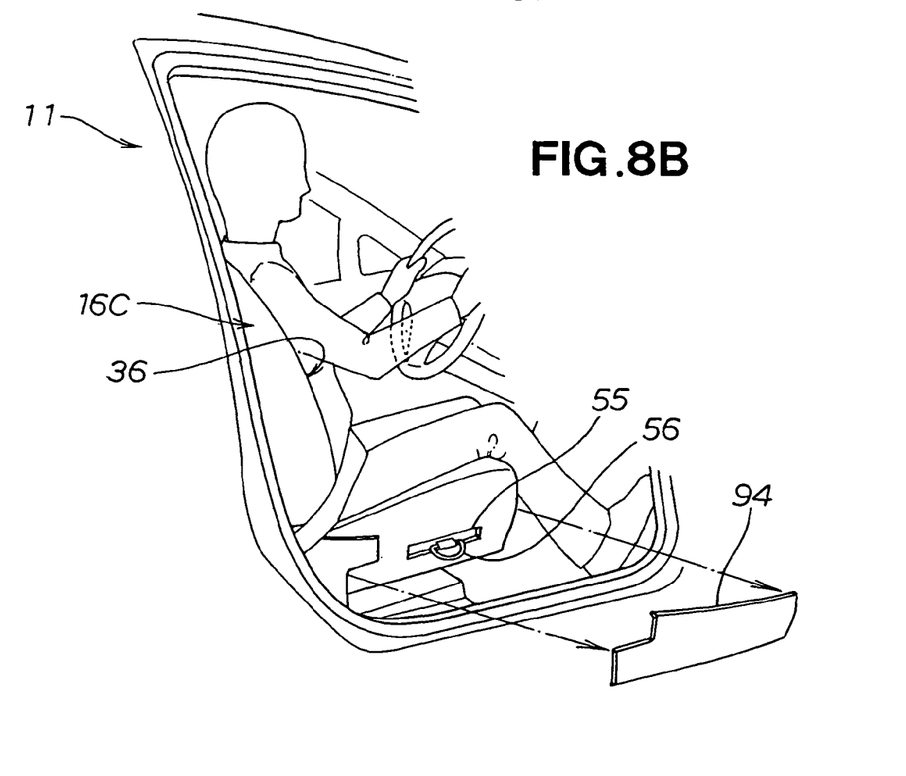

Reference is made next to FIGS. 8A and 8B showing a cushion structure according to a third embodiment of the present invention. Members that are the same as in the cushion structure of the first embodiment shown in FIGS. 1 and 2 have been given the same reference symbols, and descriptions thereof have been omitted.

A cushion structure 16C of the third embodiment has a removal opening cover 94 for covering the first cushion removal opening 55.

The removal opening cover 94 is detachably latched on the seat cushion frame 37 (see FIG. 2) using latching means (not shown). Using the removal opening cover 94 to cover the first cushion removal opening 55 allows the first handle 56 to be concealed.

The cushion structure 16C of the third embodiment has the same action and effect as the as the first embodiment 16.

In the cushion structure of the third embodiment, the cushion structure of the present invention is not provided to the seat back 36; however, the second cushion structure 18 of the first embodiment may be provided to the seat back 36.

Figure 9A:
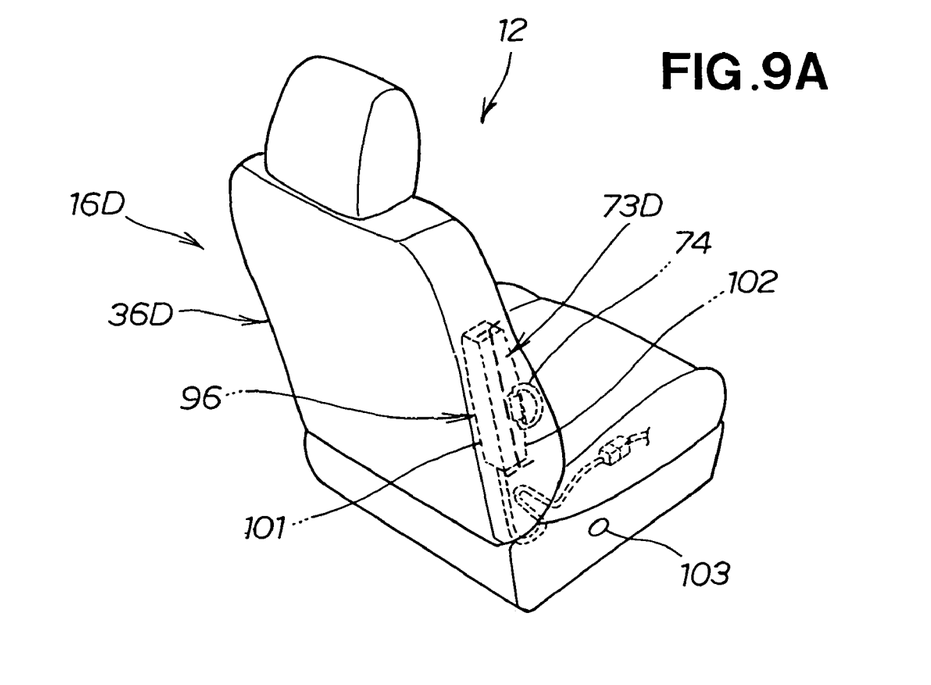
FIGS. 9A and 9B are perspective views showing a cushion structure according to a fourth embodiment of the present invention.
Figure 9B:
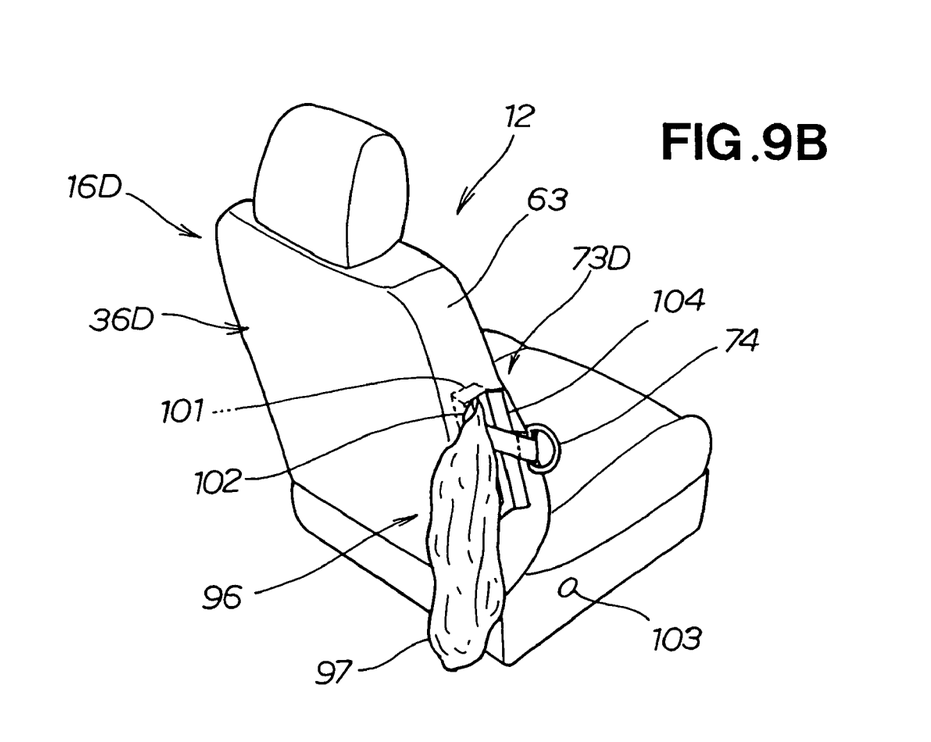

FIGS. 9A and 9B show a cushion structure of a fourth embodiment. Members that are the same as in the cushion structure of the first embodiment shown in FIGS. 1 and 2 have been given the same reference symbols, and descriptions thereof have been omitted.

In the cushion structure 16D of the fourth embodiment, a second cushion removal opening 73D is provided to a seat back 36D of the driver seat 12.

The seat back 36D has a side air bag 96. The side airbag 96 is of an existing type; and comprises an inflator (gas generator; not shown) for filling an airbag 97 (FIG. 9B) with gas, a control unit (not shown) for operating the inflator, a storage part 101 in which the airbag 97 is folded and stored, and a cover part 102 for closing the storage part 101.

The inflator operates in the same manner as existing inflators; however, an operating switch 103 is provided on the driver seat 12. The inflator is operated via the control unit based on information that the operating switch 103 has been activated, and the airbag 97 deploys.

The control unit performs a control to activate the inflator based on two types of information: information that the operating switch 103 has been activated and information that a head-on collision has occurred. In other words, it is only when the air bag provided to the steering wheel 32 (FIG. 1) has already been activated (when a head-on collision is judged to have occurred) that the control device activates the inflator based on information that the operating switch 103 has been activated.

The second cushion removal opening 73D is formed from a bursting part 104 of the second outer member 63, the bursting part 104 being burst by the cover part 102 of the side airbag 96. The second handle 74 is disposed on the outer side of the storage part 101.

The cushion structure 16D of the fourth embodiment has the same action and effect as the as the cushion structure of the first embodiment 16.

When the vehicle 11 shown in FIG. 1 is involved in a head-on collision, the control unit performs a control to activate the airbag of the steering wheel 32 based on information that a head-on collision has occurred, as received from an existing vehicle state detecting sensor (not shown). When the vehicle 11 is in the state shown in FIG. 4, and a rescuer turns on the operating switch 103 provided to the driver seat 12, the inflator is activated, and the airbag 97 starts to fill with gas, opening the cover part 102. The second outer member 63 is burst by the cover part 102, and the burst part 104 (second cushion removal opening 73D) is formed. As a result, the second handle 74 can be withdrawn via the burst part 104 (second cushion removal opening 73D).

In other words, in a normal mode, the second handle 74 is stored inside the second outer member 63 and is concealed so as to be invisible from the outside.

The cushion structure 16 of the first embodiment comprises the first cushion structure 17 and the second cushion structure 18, but may comprise merely the cushion structure 17 or the second cushion structure 18.

The first through fourth embodiments may be combined unrestrictedly in the cushion structure. For example, the first cushion removal opening 55B (see FIG. 7A) of the second embodiment can be provided to the seat cushion 34, and the second cushion removal opening 73B (see FIG. 9A) of the fourth embodiment can be provided to the seat back 36.

The first supporting member 45 and the second supporting member 65 both have flat surfaces in the vehicle seat cushion structure of the present invention, but may also have a slatted, latticed, or net-shaped form.

Obviously, various minor changes and modifications of the present invention are possible in light of the above teaching. It is therefore to be understood that within the scope of the appended claims the invention may be practiced otherwise than as specifically described.

What is claimed is:

1. A cushion structure in a vehicle seat covered by an outer cover member and disposed on a seat frame which is attached to a vehicle body, the cushion structure comprising:

a supporting member provided on the seat frame;

a first pad member provided on the seat frame and having a cushion-accommodating recess formed therein, wherein the outer cover member covers an outer surface of the first pad member to define a passenger support surface;

a cushion member in the form of a flexible elongate foam pad disposed on the supporting member and housed within the cushion-accommodating recess in a folded state; and wherein the outer cover member has a cushion-removal opening formed therein at one of left and right side portions of the seat, said cushion-removal opening being configured and sized to allow the cushion member to pass therethrough when the cushion member, while being unfolded, is withdrawn from its folded state on the supporting member;

whereby removal of the cushion member through the cushion-removal opening permits collapsing movement of the passenger support surface toward the supporting member.

2. The cushion structure of claim 1, wherein the cushion member has a handle thereon at an end thereof positioned proximately to the cushion-removal opening.

3. The cushion structure of claim 2, further comprising a pulling belt interconnecting the handle and the cushion member, wherein the belt has a low-friction surface that contacts the supporting member.

4. The cushion structure of claim 1, wherein the cushion member has a low-friction member on a surface thereof opposite a surface that contacts the supporting member.

5. The cushion structure of claim 1, wherein the supporting member has a low-friction member on a surface thereof that contacts the cushion member.

6. The cushion structure of claim 1, wherein the seat further comprises a seat frame cover attached to the seat frame and including an outer side portion facing outside of the seat frame and an inner side portion facing toward an inner portion of the seat frame, the outer side portion having an outer cushion-removal opening formed therein.

7. The cushion structure of claim 1, wherein, in the folded state of the cushion member, parts of adjoining folded-over surfaces thereof are joined together using an adhesive with a low adhesive strength or a thread having a low tensile strength.

8. In a vehicle body having a passenger compartment and a door opening, a vehicle seat comprising:
a seat frame which is attached to the vehicle body,
a cushion-supporting member provided on the seat frame;
a first pad member provided on the seat frame and having a cushion-accommodating recess formed therein;
a cushion member in the form of an elongate foam pad disposed on the cushion-supporting member and housed within the cushion-accommodating recess in a folded state;
an outer cover covering the first pad member and the cushion member, wherein the outer cover member covers an outer surface of the first pad member to define a passenger support surface, said outer cover having a cushion-removal opening formed therein and sized to allow the cushion member to pass therethrough when the cushion member, while being unfolded, is withdrawn from the supporting member; and
a seat frame cover attached to the seat frame and extending outside of the outer cover, the seat frame cover including an outer side portion facing toward the door opening and an inner side portion facing toward an interior of the passenger compartment, the outer side portion having an outer removal opening formed therein;
whereby removal of the cushion member through the cushion-removal opening permits collapsing movement of the passenger support surface toward the supporting member.

9. The vehicle seat of claim 8, wherein the cushion member has a handle thereon at an end thereof positioned proximately to the cushion-removal opening.

10. The vehicle seat of claim 8, wherein the cushion member has a low-friction member on a surface thereof that contacts the cushion-supporting member.

11. The vehicle seat of claim 8, wherein the cushion-supporting member has a low-friction member on a surface thereof that contacts the cushion member.

12. The vehicle seat of claim 8, further comprising a pulling belt interconnecting the handle and the cushion member, wherein the belt has a low-friction surface that contacts the supporting member.

13. The vehicle seat of claim 8, wherein, in the folded state of the cushion member, parts of adjoining folded-over surfaces thereof are joined together using an adhesive with a low adhesive strength or a thread having a low tensile strength.

14. In a vehicle body having a passenger compartment and a door opening, a vehicle seat comprising a seat cushion assembly and a seat back assembly adjustably attached to the seat cushion assembly, said seat cushion assembly comprising:
a seat frame which is attached to the vehicle body,
a seat cushion-supporting member provided on the seat frame;
a first pad member provided on the seat frame and having a cushion-accommodating recess formed therein;
a seat cushion member in the form of a flexible elongate foam pad disposed on the seat cushion-supporting member and housed within the cushion-accommodating recess in a folded state; and
a first outer cover covering the first pad member and the seat cushion member, wherein the outer cover member covers an outer surface of the first pad member to define a first passenger support surface, said first outer cover having a first cushion-removal opening formed therein, the first cushion-removal opening being configured and sized to allow the seat cushion member to pass therethrough when the seat cushion member, while being unfolded, is withdrawn from its folded state on the seat cushion-supporting member; and said seat back assembly comprising:
a seat back frame which is adjustably attached to the seat frame,
a seat back frame cover attached to the seat back frame and including an outer side portion facing toward the door opening and an inner side portion facing toward an interior of the passenger compartment, the outer side portion of the seat back frame cover having a second removal opening formed therein;
a seat back cushion-supporting member provided on the seat back frame;
a second pad member attached to the seat back cushion-supporting member and having a seat back cushion-accommodating recess formed therein, the second pad member being substantially fixed in place in relation to the seat back cushion-supporting member;
a seat back cushion member in the form of an elongate foam pad disposed in the seat back cushion-accommodating recess in a folded configuration thereof; and
a second outer cover member covering the second pad member and the seat back cushion member, wherein the second outer cover member covers an outer surface of the second pad member to define a second passenger support surface, said second outer cover having a second cushion-removal opening formed therein, the second cushion-removal opening being configured and sized to allow the seat back cushion member to pass therethrough when the seat back cushion member, while being unfolded, is withdrawn from its folded state in the seat back cushion-accommodating recess;
whereby removal of the seat cushion member through the first cushion-removal opening permits collapsing movement of the first passenger support surface toward the seat-supporting member, and removal of the seat back cushion member through the second cushion-removal opening permits collapsing movement of the second passenger support surface toward the seat back cushion-supporting member.

15. The vehicle seat of claim 14, wherein the seat cushion member has a handle thereon at an end thereof positioned proximately to the first cushion-removal opening.

16. The vehicle seat of claim 14, wherein the seat cushion member has a low-friction member on a surface thereof opposite a surface that contacts the seat-supporting member.

17. The vehicle seat of claim 14, wherein the seat-supporting member has a low-friction member on a surface thereof that contacts the seat cushion member.

18. The vehicle seat of claim 15, further comprising a pulling belt interconnecting the handle and the seat cushion member, wherein the belt has a low-friction surface that contacts the seat-supporting member.

19. The vehicle seat of claim 15, wherein, in the folded state of the seat cushion member, parts of adjoining folded-over surfaces thereof are joined together using an adhesive with a low adhesive strength or a thread having a low tensile strength.

* * * * *